United States Patent [19]

Meyler-Warlow et al.

[11] 4,233,373
[45] Nov. 11, 1980

[54] CELL CASING AND GROMMET THEREFORE

[75] Inventors: Ian Meyler-Warlow; Graham H. Law, both of Redditch, England

[73] Assignee: Heatherbourne Plastics Limited, England

[21] Appl. No.: 29,252

[22] Filed: Apr. 11, 1979

[30] Foreign Application Priority Data

Apr. 12, 1978 [GB] United Kingdom ............... 14339/78

[51] Int. Cl.³ ............................................. H01M 2/30
[52] U.S. Cl. ................................. 429/181; 174/153 G
[58] Field of Search ............... 429/181, 182, 183, 184, 429/160, 65; 174/152 G, 153 G; 339/116 R

[56] References Cited

U.S. PATENT DOCUMENTS

| 1,599,836 | 9/1926 | Owen | 429/183 |
| 1,631,555 | 6/1927 | Seward et al. | 339/116 R |
| 2,897,533 | 8/1959 | Bull et al. | 174/153 G |

FOREIGN PATENT DOCUMENTS

| 1117303 | 5/1956 | France | 174/153 G |
| 573123 | 11/1945 | United Kingdom | 429/65 |

Primary Examiner—Donald L. Walton
Attorney, Agent, or Firm—Newton, Hopkins & Ormsby

[57] ABSTRACT

A grommet has a central opening and a peripheral groove defining spaced first and second peripheral lips, the opening aligned with the first peripheral lip is of increased width so that the lip may flex inwardly to allow insertion over a cell terminal post after assembly. The first peripheral lip has an inclined surface which cooperates with an inclined surface on the cell casing to facilitate insertion of the grommet. An electric cell including such a grommet is also disclosed.

2 Claims, 3 Drawing Figures

4,233,373

CELL CASING AND GROMMET THEREFORE

This invention relates to an improved grommet, to an electric cell including such a grommet, and to a method of assembling an electric cell including such a grommet.

Generally a grommet is made from an elastic material such as rubber and, for a circular hole for example, comprises a cylindrical body having a circumferential groove which engages the edge of the hole.

Such known grommets are used a great deal in the manufacture of storage batteries and accumulators for example for sealing about the terminal posts which protrude from the body of the cell. A conventional cell comprises a casing in which a plurality of lead plate electrodes are immersed in an electrolyte of dilute sulphuric acid. However as a single cell of an anode plate, cathode plate and electrolyte only produces a potential difference of about 2 volts, a number of cells are usually connected together in series in one casing to increase the voltage. The interconnection of the plate electrodes is usually effected by welding a terminal post to each plate and joining the respective pole posts together in the appropriate manner. The posts extend through holes in the top of the casing and are joined by a lead connector bar or a thick insulated cable. Grommets are used to seal the holes through which the posts pass and are fitted to the top of the casing before the top is fitted to the rest of the casing by welding.

A disadvantage of known grommets, particularly in battery manufacture, is that they have to be positioned in the holes in the top of the casing before the top is positioned over the terminal posts otherwise they cannot be fitted.

Therefore according to one aspect of the present invention a grommet comprises a body having an opening therethrough and a peripheral groove defining first and second peripheral lips, the opening in the body of the grommet aligned with the first peripheral lip being of increased width so that in use the first peripheral lip may flex inwardly.

Preferably the first peripheral lip is of reduced width compared with the second peripheral lip and also tapers inwardly away from the groove thereby providing an inwardly inclined surface. The internal diameter of the opening may gradually increase from a position substantially aligned with the groove towards the first peripheral lip thereby providing an outwardly inclined surface.

The invention also includes an electric cell comprising two or more terminals protruding from the cell casing wherein the holes through which the terminals protrude are each surrounded by a grommet in accordance with the invention as set out above. Preferably each opening in the top of the casing includes an inclined surface cooperating with the inwardly inclined surface on the first peripheral lip.

According to another aspect of the invention a method of assembling an electric cell including a casing in which a plurality of electrodes are disposed, a plurality of terminal posts secured to the electrodes and protruding above the rim of the casing, a top for the cell casing having a plurality of holes therein for receiving the protruding terminal posts and a plurality of grommets in accordance with the invention as set out above for the holes receiving the terminal posts, comprises the steps of positioning the top over the terminal posts so that the terminal posts pass through the holes in the top, securing the top to the rest of the casing, and positioning the grommets by passing them over the terminal posts and flexing the said first lip of each grommet at the hole in the top to enable the lip to be seated on the inside of the top and the edge of the hole to be disposed within the peripheral groove.

The invention will now be described by way of example with reference to the accompanying drawings in which.

Figure 1:
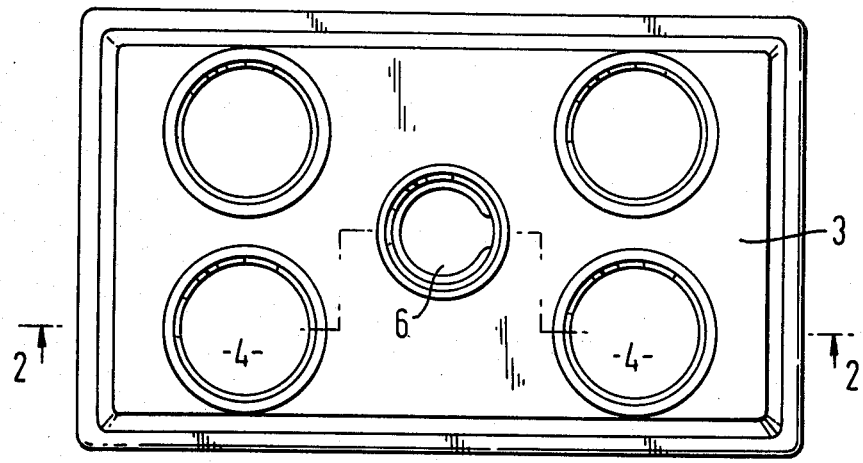
FIG. 1 is a top plan view of one form of a storage battery casing.
Figure 2:
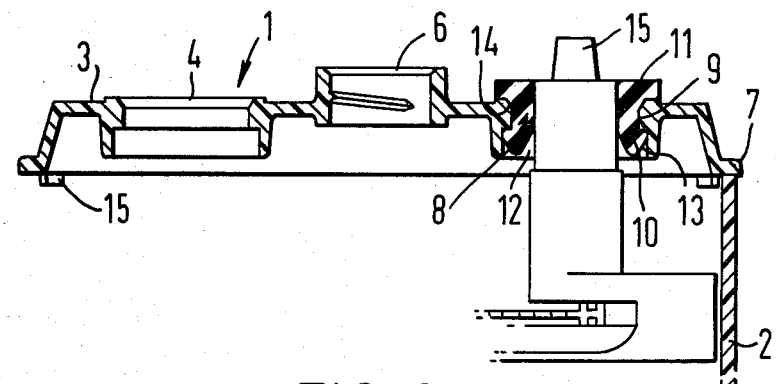
FIG. 2 illustrates a partial cross-sectional side elevation of the line 2—2 of the storage battery and including a grommet in accordance with the present invention surrounding a terminal post.

In FIGS. 1 and 2 of the drawings a storage battery 1 comprises a casing 2 and a top 3. The top 3 has a plurality of openings 4 through which terminal posts 5 (only one of which is shown for clarity) protrude. The top 3 also has a central opening 6 by means of which the battery 1 may be filled or refilled with electrolyte. The top 3 has corner locating ribs 15 so as to facilitate fitting into the casing 2 and is welded to the casing 2 with a peripheral overhang 7 provided for this purpose.

Surrounding the opening 4 through which the terminal post 5 protrudes is a grommet 8 of rubber or like resilient material. The grommet 8 has a peripheral groove 9 defining inner and outer peripheral lips 10 and 11 which embrace the edge of the opening 4. As clearly seen from the drawing the opening in the grommet at the position aligned with the inner peripheral lip 10 is of increased width providing an undercut portion 12 allowing the inner peripheral lip 10 to flex inwardly. In addition the inner peripheral lip 10 is of reduced width in comparison with the peripheral lip 11 and has an inwardly inclined surface 13 directed away from the groove 9. The inclined surface 13 is adapted to co-operate with an inclined surface 14 on the edge of the opening 4 thereby causing the inner peripheral lip 10 to flex inwardly.

In use of the first embodiment the top 3 is placed over the terminal posts 5 and then welded to the casing 2. The grommets 8 are then fitted by passing the grommets 8 over a respective post 5. As the main part of the opening through a grommet is dimensioned to correspond with the external configuration of the respective terminal post 5 only the undercut portion 12 allows the grommets to be fitted after the top 3 has been welded to the rest of the casing 2. This undercut portion 12 allows the inner peripheral 11p 10 to flex inwardly during insertion, as guided by the cooperating inclined surfaces 13 and 14, and then spring outwardly to engage beneath a shoulder 15 provided at the edge of the opening 4.

Figure 3:
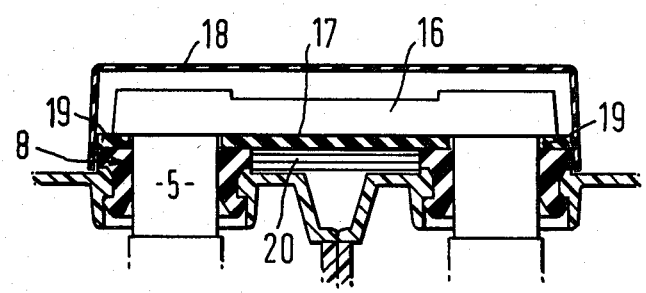
FIG. 3 is a cross-sectional transverse elevation of an alternative embodiment.

In FIG. 3 an alternative embodiment is shown in which the pairs of terminal posts 5 are interconnected in series by a lead connector bar 16 which in turn is enclosed by a two-part protective cover.

The two part protective cover includes an electrically non-conductive strap 17 and a cover 18. The strap 17 has two spaced holes 19 to receive the posts 5 and one of the holes 8 is slightly elongated to accommodate varying dimensions of the components. The strap 17 is seated on the upper flat surface of the grommet 8.

The cover 18 is shaped to fit over the strap 17 and has two longitudinal moulded lugs 20 which extend along the centre of the sides of the cover 18 and in use engage under the strap 17 to retain the cover 18 in position.

In use, the top 3 of the accumulator casing 2 is positioned over the posts 5 and the adjacent edges of the top 3 as described above. The strap 17 is then applied over the lead posts 5 and will rest upon the grommets 8. The lead connector bar 16 is then placed over the posts 5 and a 'burning-up' process applied whereby the lead connector bar 16 and posts 5 are welded together. The cover 18 may now be placed over the connected terminals to totally encapsulate the terminals and, because of the moulded lugs 9, a snap fit is assured.

As will be understood the preferred feature of the openings in the top of the casing including an inclined surface which, in use, cooperates with an inwardly inclined surface of a grommet greatly facilitates the insertion of the grommet once the top has been welded in position. The grommet is preferably of rubber or like resilient material and allows for expansion of growth of the plates.

We claim

1. An electric cell comprising a casing having a bottom, side walls and a top, said top having an inner and an outer surface, a plurality of holes in the top, a terminal post protruding through each hole, an inclined surface on the outer surface of the top and about each hole, a planar surface portion on the inner surface of the top about each hole and extending substantially perpendicular to the axis of the respective hole, and a grommet located in each hole sealing between the respective terminal post and the top, the grommets each including a body, an opening through the body through which the respective terminal post passes, and a peripheral groove about the body defining spaced first and second peripheral lips, said first peripheral lip engaging on the planar surface portion of the inner surface of the top, said second peripheral lip engaging on the outer surface of the top, said opening including a cylindrical portion aligned with said second peripheral lip merging into a portion of increased width aligned with the first peripheral lip, and said first peripheral lip tapering away from the peripheral groove thereby providing an annular inwardly-inclined surface, the inwardly-inclined surface on the first peripheral lip during fitting cooperating with the inclined surface on the top to facilitate insertion of the grommet, and the portion of the opening of increased width permitting the first peripheral lip to flex inwardly so as to engage the planar surface on said inner surface of the top.

2. In an electric cell, a cell casing and a top cover for the casing, the top cover having an opening receiving a terminal post of the cell therethrough in spaced concentric relationship, said opening having a conically beveled entrance at its top, a restricted cylindrical portion immediately below said beveled entrance and an enlarged cylindrical portion at its bottom coaxial with said restricted portion and joined therewith by an annular shoulder in a plane across the axis of the opening and terminal post, and an elastic grommet having a central cylindrical through bore adapted to snugly receive a top portion of the terminal post and having an annular groove intermediate its ends snugly receiving the beveled entrance and said restricted cylindrical portion, there being a top annular flange on said grommet immediately above said groove abutting the upper face of said top cover immediately above and radially outwardly of said beveled entrance, and a bottom annular lip on the grommet immediately below said groove and being externally and internally conically tapered toward the bottom end of the grommet, the internal tapered face of said bottom lip leading from said cylindrical through bore at a point adjacent to said annular shoulder and the external tapered face of the bottom lip leading downwardly from said shoulder and forming on the grommet a coacting external annular shoulder having interlocking engagement below the first-named annular shoulder.

* * * * *